(12) United States Patent
Lee et al.

(10) Patent No.: US 9,119,450 B2
(45) Date of Patent: Sep. 1, 2015

(54) CONTACT LENS PACKAGE

(71) Applicant: Novartis AG, Basel (CH)

(72) Inventors: Chea Beng Lee, Singapore (SG); Jia Peng Tang, Singapore (SG); Chze Chow Ng, Singapore (SG); Long Yeng Lim, Singapore (SG)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/108,459

(22) Filed: Dec. 17, 2013

(65) Prior Publication Data

US 2014/0183063 A1    Jul. 3, 2014

Related U.S. Application Data

(60) Provisional application No. 61/745,105, filed on Dec. 21, 2012.

(51) Int. Cl.
| | |
|---|---|
| *B65B 55/18* | (2006.01) |
| *B65B 55/22* | (2006.01) |
| *A45C 11/00* | (2006.01) |
| *B65B 25/00* | (2006.01) |

(Continued)

(52) U.S. Cl.
CPC ............. *A45C 11/005* (2013.01); *B65B 25/008* (2013.01); *B65B 51/10* (2013.01); *B65D 75/326* (2013.01); *B65D 2575/3245* (2013.01); *B65D 2585/545* (2013.01)

(58) Field of Classification Search
CPC ................................. A45C 11/005; B65B 5/10

USPC ........... 53/431–432, 461, 471, 485, 488, 489, 53/510, 511, 545, 562, 281
See application file for complete search history.

(56) References Cited

U.S. PATENT DOCUMENTS

| | | |
|---|---|---|
| 3,679,509 A | 7/1972 | Fielibert |
| 3,956,867 A | 5/1976 | Utz |
| 4,510,014 A | 4/1985 | Artusi |

(Continued)

FOREIGN PATENT DOCUMENTS

| | | |
|---|---|---|
| CH | 652965 A5 | 12/1985 |
| EP | 0033824 A1 | 8/1981 |

(Continued)

OTHER PUBLICATIONS

PCT International Search Report dated May 23, 2014, International Application No. PCT/EP2013/076869, International Filing Date Dec. 17, 2013.

(Continued)

*Primary Examiner* — Robert Long
(74) *Attorney, Agent, or Firm* — Sheng-Hsin Hu

(57) ABSTRACT

A plastic container for storing a hydrogel contact lens in a liquid, the container comprising: a cavity and a substantially flat flange that extends in a plane around the opening periphery of the cavity, and the flange having a sealing area round the circumference of the cavity. Furthermore, the sealing area has a micro-texture pattern. When sealing the container with a flexible cover sheet which is a laminate material having a metal foil layer and at least one polymer layer to form a storage package of the soft contact lens, the micro-texture pattern of the sealing area engages a laminate foil cover and displaces water beads present between the laminate foil cover and the plastic container in the sealing area around the cavity to form a heat seal.

8 Claims, 4 Drawing Sheets

(51) Int. Cl.
  *B65B 51/10* (2006.01)
  *B65D 75/32* (2006.01)

(56) References Cited

U.S. PATENT DOCUMENTS

| | | | |
|---|---|---|---|
| 4,589,568 A | 5/1986 | Ito | |
| 4,689,099 A | 8/1987 | Ito | |
| 4,691,820 A | 9/1987 | Martinez | |
| 4,776,150 A | 10/1988 | Siegel | |
| 4,798,639 A | 1/1989 | Yamaguchi | |
| 4,955,580 A * | 9/1990 | Seden et al. | 249/82 |
| 4,969,965 A | 11/1990 | Matty | |
| 5,036,971 A * | 8/1991 | Seden et al. | 206/5.1 |
| 5,155,971 A | 10/1992 | Zopf | |
| 5,157,901 A | 10/1992 | Okamoto | |
| 5,173,143 A | 12/1992 | Fujii | |
| 5,269,123 A | 12/1993 | Marchesini | |
| 5,282,920 A | 2/1994 | Fujii | |
| 5,316,603 A | 5/1994 | Akazawa | |
| 5,418,022 A * | 5/1995 | Anderson et al. | 428/35.2 |
| 5,467,868 A | 11/1995 | Abrams | |
| 5,488,815 A | 2/1996 | Abrams | |
| 5,494,155 A | 2/1996 | Evans | |
| 5,582,665 A | 12/1996 | Eigen | |
| 5,609,246 A | 3/1997 | Borghorst | |
| 5,620,087 A | 4/1997 | Martin | |
| 5,620,088 A | 4/1997 | Martin | |
| 5,623,816 A | 4/1997 | Edwards | |
| 5,626,000 A | 5/1997 | Edwards | |
| 5,644,895 A | 7/1997 | Edwards | |
| 5,704,468 A | 1/1998 | Lust | |
| 5,791,120 A | 8/1998 | DeYoung | |
| 5,983,607 A | 11/1999 | Mihalov | |
| 6,029,808 A | 2/2000 | Peck | |
| 6,082,533 A | 7/2000 | Smith | |
| 6,091,054 A | 7/2000 | Mihalov | |
| RE37,558 E | 2/2002 | Abrams | |
| 6,413,334 B1 | 7/2002 | Rittner | |
| 6,474,465 B1 | 11/2002 | Jux | |
| 6,889,825 B2 | 5/2005 | Ichikawa | |
| 7,056,405 B2 | 6/2006 | Worden | |
| 7,086,526 B2 | 8/2006 | Newman | |
| 7,410,050 B2 * | 8/2008 | Py et al. | 206/5.1 |
| 7,448,184 B2 | 11/2008 | Clark | |
| 7,967,133 B2 * | 6/2011 | Newman | 206/5.1 |
| 8,459,445 B2 * | 6/2013 | Newman | 206/5.1 |
| 2002/0046958 A1 * | 4/2002 | Lipscomb et al. | 206/5.1 |
| 2003/0029736 A1 | 2/2003 | Phillips | |
| 2004/0112008 A1 | 6/2004 | Voss | |
| 2005/0188650 A1 | 9/2005 | Voss | |
| 2005/0223676 A1 | 10/2005 | Polster | |
| 2005/0226488 A1 | 10/2005 | Barry | |
| 2006/0090425 A1 | 5/2006 | Fenn | |
| 2006/0236659 A1 | 10/2006 | Miyazawa | |
| 2007/0033906 A1 * | 2/2007 | Kernick et al. | 53/485 |
| 2007/0056861 A1 | 3/2007 | Duis | |
| 2008/0314501 A1 | 12/2008 | Sullivan | |
| 2009/0045080 A1 * | 2/2009 | O'Neill et al. | 206/5.1 |
| 2009/0107855 A1 | 4/2009 | Gault | |
| 2009/0113851 A1 | 5/2009 | Carr | |
| 2009/0236239 A1 * | 9/2009 | Yamada et al. | 206/5.1 |
| 2011/0094898 A1 | 4/2011 | Tang | |
| 2011/0180429 A1 * | 7/2011 | Josephson et al. | 206/205 |
| 2014/0246337 A1 * | 9/2014 | Newman | 206/5.1 |
| 2014/0284229 A1 * | 9/2014 | Newman | 206/213.1 |
| 2015/0114851 A1 * | 4/2015 | English et al. | 206/5.1 |

FOREIGN PATENT DOCUMENTS

| | | |
|---|---|---|
| EP | 0039056 A1 | 11/1981 |
| EP | 0344340 A1 | 12/1989 |
| EP | 0604507 A1 | 7/1994 |
| EP | 1277416 A2 | 1/2003 |
| EP | 1340678 A1 | 9/2003 |
| FR | 2481641 A1 | 11/1981 |
| GB | 2433913 | 7/2007 |
| JP | 58194514 A | 11/1983 |
| JP | 03000666 A | 1/1991 |
| JP | 03043328 A | 2/1991 |
| JP | 04367403 A | 12/1992 |
| JP | 2002321284 A | 11/2002 |
| JP | 2006168805 A | 6/2006 |

OTHER PUBLICATIONS

PCT Written Opinion of the International Searching Authority dated May 23, 2014, International Application No. PCT/EP2013/076869, International Filing Date Dec. 17, 2013.

* cited by examiner

CONTACT LENS PACKAGE

This application claims the benefit under 35 USC §119 (e) of United States provisional application No. 61/745,105 filed Dec. 21, 2012, incorporated by reference in its entirety.

The present invention relates generally to the packaging of ophthalmic lenses and more particularly to contact lens plastic container used to cover and seal blister packages during the lens packaging process.

BACKGROUND OF THE INVENTION

Ophthalmic lenses, such as contact lenses, are often packaged in individual packages, typically known as "blister packages." A blister pack generally consists of a plastic container defining a concave cavity adapted to house a sterile aqueous solution and at least one lens, and a laminate foil used to cover the plastic container and contain the solution and lens therein. Such packaging keeps the lens in a hydrated state before being opened and worn by a user. Often, a lens is contained within a blister package for a significant amount of time while the lens is being shipped and held in storage before use. Therefore, it is important that the aqueous solution be hermetically sealed therein, to ensure that the solution cannot leak out and to prevent contaminants from entering the lens containment area. One method of hermetically sealing the laminate foil to the plastic container utilizes a heating element, or heated seal plate, to create a heat seal between the foil and the area surrounding the plastic container. Heated seal plates typically include a flat face that corresponds to the area of the container surrounding the cavity, such that a heat seal is formed where the seal plate engages and applies pressure and heat against the laminate foil/plastic container.

Unfortunately, under certain conditions a hermetic seal is not formed between the foil cover and plastic shell, which can permit the aqueous solution to leak out of the blister package or contaminants to infiltrate the lens area. Accordingly, needs exist for improvements to ophthalmic lens packaging systems that prevent poor seals from developing between the cover and plastic shell of a blister package. It is to the provision of these needs and others that the invention of present invention is directed.

SUMMARY OF THE INVENTION

The present invention, in one aspect, provides a method for packaging a hydrogel contact lens, comprising the steps of:
(a) providing a plastic container having a cavity and a flat flange that horizontally extends in a plane around the perimeter of the cavity, wherein the flange having a sealing area surrounding circumferentially and adjacently about of the cavity, wherein the sealing area having a micro-texture pattern,
(b) placing an amount of the packaging solution and the soft contact lens in the container, wherein the amount of the packaging solution is sufficient to have the hydrogel contact lens to be fully immersed;
(c) heat sealing the container using a heated flat seal plate with a flexible cover sheet which is a laminate material comprising a metal foil layer and at least one polymer layer to form a storage package of the soft contact lens;
wherein during the step of heat sealing, the micro-texture pattern engages a laminate foil cover and displaces water beads present between the laminate foil cover and the plastic container in the sealing area to form a heat seal, provided that after heat sealing the sealing area is smooth and leveled to the flange.

The present invention, in another aspect, provides a plastic container for storing a hydrogel contact lens in a liquid, the container comprising: a cavity and a flat flange that horizontally extends in a plane around the perimeter of the cavity, wherein the flange having a sealing area surrounding circumferentially and adjacently about of the cavity, wherein the sealing area having a micro-texture pattern.

BRIEF DESCRIPTION OF THE DRAWINGS

The present invention will be fully understood from the following detailed description, taken in conjunction with the accompanying drawings, wherein like reference numerals refer to like arts,.

DETAILED DESCRIPTION OF THE PREFERRED EMBODIMENT

Figure 1:
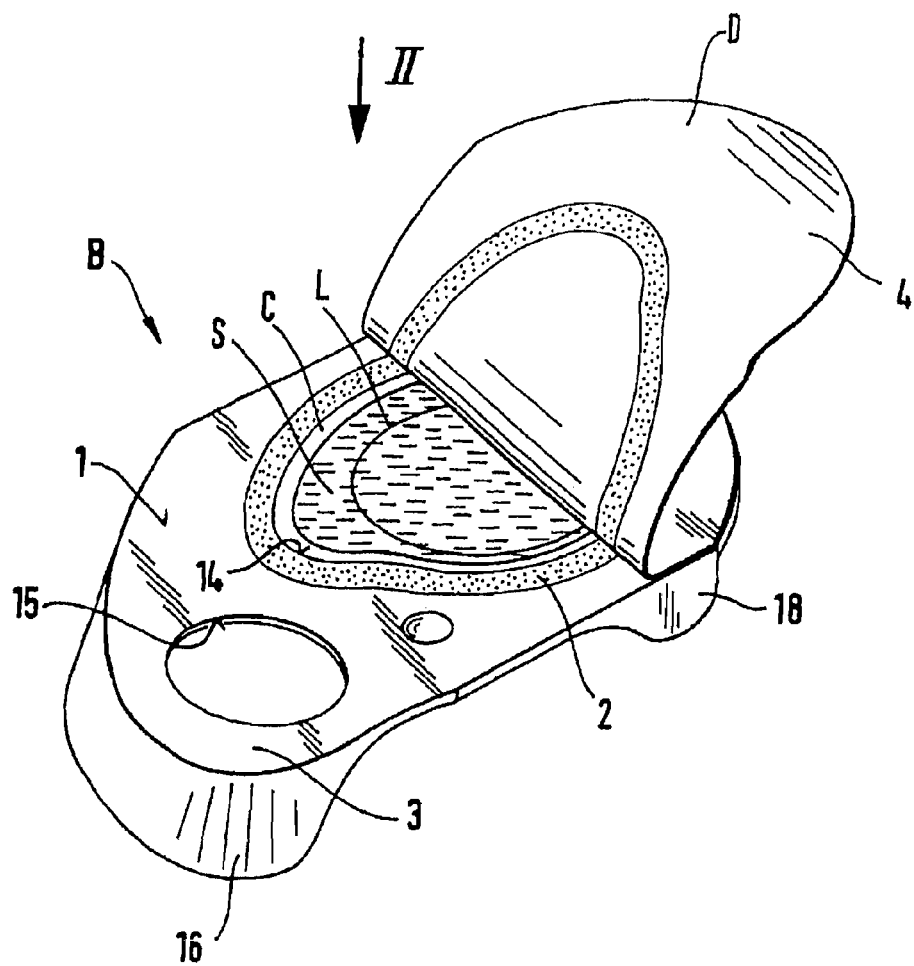
FIG. 1 is an oblique view of the blister pack according to the invention.

Reference will now be made in detail to the presently preferred embodiment of the invention, one or more examples of which are illustrated in the drawings. Each example is provided by way of explanation of the invention and not meant as a limitation of the invention. For example, features illustrated or described as part of one embodiment or figure can be used on another embodiment or figure to yield yet another embodiment. It is intended that the present invention include such modifications and variations.

The present invention is generally directed to a method for packaging a hydrogel contact lens, comprising the steps of:
(a) providing a plastic container having a cavity and a flat flange that horizontally extends in a plane around the perimeter of the cavity, wherein the flange having a sealing area surrounding circumferentially and adjacently about of the cavity, wherein the sealing area having a micro-texture pattern,
(b) placing an amount of the packaging solution and the soft contact lens in the container, wherein the amount of the packaging solution is sufficient to have the hydrogel contact lens to be fully immersed;
(c) heat sealing the container using a heated flat seal plate with a flexible cover sheet which is a laminate material comprising a metal foil layer and at least one polymer layer to form a storage package of the soft contact lens;
wherein during the step of heat sealing, the micro-texture pattern engages a laminate foil cover and displaces water beads present between the laminate foil cover and the plastic container in the sealing area to form a heat seal, provided that after heat sealing the sealing area is smooth and leveled to the flange.

Sealing quality is one of the critical parameters of Contact Lens. Poor sealing will increase infection risk by microorganism onto the consumers; Lens dehydration due to the drying of saline in the container jeopardizes the products quality standard in market. Therefore, astringent control is needed at the manufacturing site in order to minimize this seal leakage issue; as one seal leakage detected will cause the whole lot to be scrapped. For seal width issue (seal width less than 1.5 mm), re-sorting is needed for the whole lot to ensure quality sealing is achieved before delivery to consumers. Currently, the manufacturing site has to bear with the cost of the extra effort and waste. One of the factors was determined which could cause seal leakage and seal width issues is small water beads that is splattered onto the sealing area of container. The spattered water beads occur during which the Lens is placed into the container, which is carried over from previous processes. This is unavoidable and uncontrollable even when extra drying process is imposed in prior process to prevent water carry over. It is difficult to detect since not every single product will be checked for sealing quality.

However, if these defects are recognized by chance or by spot checks, then either the whole batch has to be rejected or all the contact lens packages have to undergo 100% manual checking. Both procedures involve substantial costs. Similar problems also arise with other packages that are filled with sensitive products.

It has been found that by utilizing a seal zone of the container having a surface micro-texture pattern surface, small water beads or moisture that is present between the cover and plastic bowl can be displaced away from the seal area to improve contact and sealing between the cover and bowl. In the present invention, the sealing is accomplished to utilize a flat seal plate to apply heat and pressure to the laminate foil covers of the blister packages. Direct contact between the cover and bowl facilitates a proper hermetic heat seal between the same.

With reference now to the drawing figures, wherein like reference numbers represent corresponding parts throughout the several views, FIG. 1 shows a blister pack container for storing a contact lens according to an example embodiment of the invention. U.S. Pat. No. 5,609,246 to Borghorst et al is incorporated herein by reference in its entirety for additional details regarding the general construction of an example form of blister pack container. It will be understood, however, that the present invention is suitable for application to a variety of different container formats, and is not limited to the particular container styles identified.

In according with the present invention, a hydrogel contact of prepared by curing in a mold any formulations for making hydrogel contact lenses. Exemplary formulations include without limitation the formulation of Nelfilcon, lotrafilcon A, lotrafilcon B, etafilcon A, genfilcon A, lenefilcon A, acquafilcon A, and balafilcon.

In accordance with the present invention, a packaging solution is ophthalmically compatible, meaning that a contact lens treated with the solution is generally suitable and safe for direct placement on the eye without rinsing, that is, the solution is safe and comfortable for contact with the eye via a contact lens that has been wetted with the solution. A packaging solution of the invention may be any water-based solution that is used for the storage of contact lenses. Typical solutions include, without limitation, saline solutions, other buffered solutions, and deionized water. The preferred aqueous solution is saline solution containing salts including one or more other ingredients known to a person skilled in the art. Examples of other ingredients include without limitation, suitable buffer agents, tonicity agents, water-soluble viscosity builders, surfactants, antibacterial agents, preservatives, and lubricants (e.g., cellulose derivatives, polyvinyl alcohol, polyvinyl pyrrolidone).

The pH of a packaging solution should be maintained within the range of about 6.0 to 8.0, preferably about 6.5 to 7.8. Examples of physiologically compatible buffer systems include, without limitation, acetates, phosphates, borates, citrates, nitrates, sulfates, tartrates, lactates, carbonates, bicarbonates, tris, tris derivative, and mixtures thereof. The amount of each buffer agent is that amount necessary to be effective in achieving a pH of the composition of from 6.0 to 8.0.

Typically, the aqueous solutions for packaging and storing contact lenses are also adjusted with tonicity adjusting agents, to approximate the osmotic pressure of normal lacrimal fluids which is equivalent to a 0.9 percent solution of sodium chloride or 2.5 percent of glycerol solution. The solutions are made substantially isotonic with physiological saline used alone or in combination, otherwise if simply blended with sterile water and made hypotonic or made hypertonic the lenses will lose their desirable optical parameters. Correspondingly, excess saline may result in the formation of a hypertonic solution which will cause stinging and eye irritation.

Examples of suitable tonicity adjusting agents include, but are not limited to: sodium and potassium chloride, dextrose, glycerin, calcium and magnesium chloride. These agents are typically used individually in amounts ranging from about 0.01 to 2.5% (w/v) and preferably, form about 0.2 to about 1.5% (w/v). Preferably, the tonicity agent will be employed in an amount to provide a final osmotic value of 200 to 400 mOsm/kg and more preferably between about 250 to about 350 mOsm/kg, and most preferably between about 280 to about 320 mOsm/kg.

Examples of the preservative may be benzalkonium chloride and other quaternary ammonium preservative agents, phenylmercuric salts, sorbic acid, chlorobutanol, disodium edetate, thimerosal, methyl and propyl paraben, benzyl alcohol, and phenyl ethanol.

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic®707, 1107 and 1307, polyethylene glycol esters of fatty acids (e.g., Tween®20, Tween® 80), polyoxyethylene or polyoxypropylene ethers of $C_{12}$-$C_{18}$ alkanes (e.g., Brij® 35), polyoxyethyene stearate (Myrj® 52), polyoxyethylene propylene glycol stearate (Atlas® G 2612), and amphoteric surfactants under the trade names Mirataine® and Miranol®.

In according with the present invention, the blister pack as shown in FIG. 1, could comprise a base portion B and a cover layer D. The base portion B comprises a cavity C that accommodates a soft contact lens L and a sterile preserving solution S suitable for the type of lens concerned, and also a substantially flat flange 1 that extends right round the outside of, or surrounds, the cavity C. The cover layer D, which is likewise flat, is releasably sealed to the flange 1 in a sealing zone 2 that extends round the circumference of the cavity C. On one side of the cavity C, the flange 1 is slightly wider and has there a grip region 3 that extends away from the cavity C beyond the sealing zone 2 and is covered by a corresponding grip region 4 of the cover layer D. In those grip regions 3 and 4, the base portion B, or its flange 1, and the cover layer D are not sealed to one another, so that, at that site, the cover layer can readily be lifted from the flange and then pulled off the base portion. The two grip regions 3 and 4 of the flange 1 and the cover layer D form grip means for separating the cover layer from the base portion, or its flange. In FIG. 1, the cover layer D is shown partially removed from the base portion.

The base portion B can be manufactured by injection-moulding or deep-drawing, for example from polypropylene.

The cover layer D may be, for example, a laminate comprising an aluminium foil and a polypropylene film. The cover layer may be printed with information regarding the contact lens contained in the pack or with other information for the end user or the dealer. Other suitable materials and processes for the manufacture of such a blister pack are known to the person skilled in the art and are described, for example, in the U.S. Pat. No. 4,691,820 which is hereby in its entirety declared to be an integral part of the present patent description.

The sealing of the cover layer to the base portion, or its flange, can be affected by the action of heat or ultrasound or by means of some other suitable bonding process. For example, seal plates utilize a flat face to apply heat and pressure to the laminate foil covers of the blister packages, wherein the heat and pressure from the seal face create a heat seal between the cover and plastic bowl. A typical seal plate has a flat-faced design and the seal plate is not able to displace the moisture (e.g. saline solution) that occasionally splashes onto the seal area between the foil cover and plastic shell when the lens and solution is loaded into the package. This moisture can prevent a proper heat seal from developing between the cover and shell. For a sealing process, three critical parameters are involved. They are: 1) sealing temperature at about 194° C., 2) sealing pressure force at 600N and sealing time at about 1.3 to 3 seconds and 3) sealing pressure at 600N.

Figure 2:
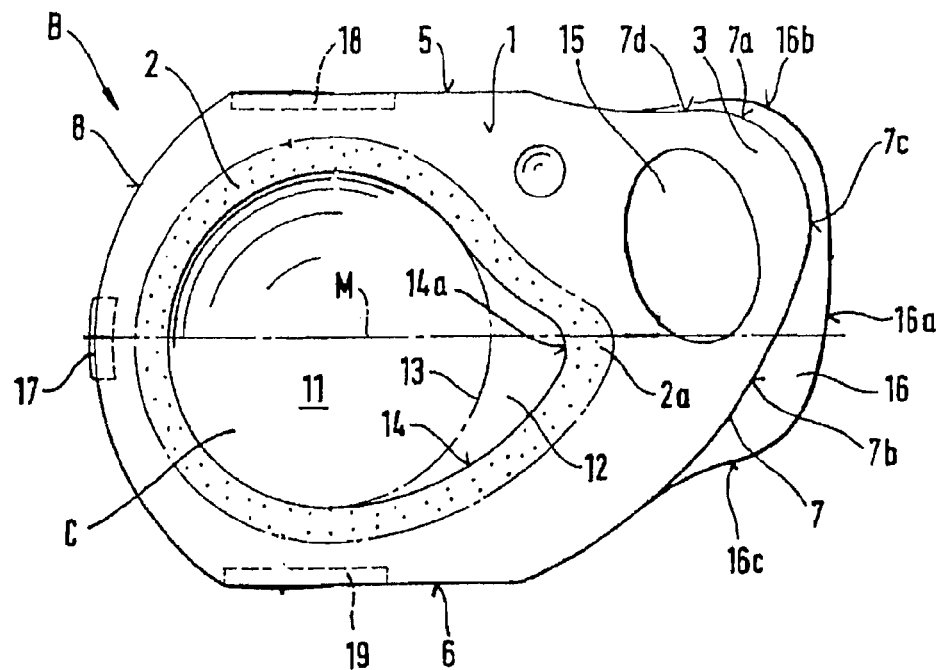
FIG. 2 is a view of the base portion of the blister pack from above in the direction of arrow II of FIG. 1.

The arrangement of the base portion B, or its flange 1, can best be seen in the plan view according to FIG. 2. The flat flange 1 has, in the broadest sense, an approximately rectangular shape and is bounded at its two sides by two parallel, substantially straight edges 5 and 6. On its other two sides, the flange 1 is bounded by a curved front edge 7 and a curved rear edge 8. The relative terms "front", "rear" and "side" refer here and hereinafter to the longitudinal axis of the flange 1, or of the blister pack in general, which axis is defined by the central line M between the two straight bounding edges 5 and 6, "front" denoting that portion of the flange 1 which comprises the grip region 3. Accordingly, the rear region of the base portion B, or of its flange 1, is to be understood as being that region of the base portion B, or of the flange 1, which lies opposite the grip region 3 with respect to the hollow chamber C. The two straight bounding edges 5 and 6 are accordingly located at the sides. The upper side is to be understood as being that side of the base portion B which is provided with the cover layer D, and the underside is accordingly to be understood as being that side of the base portion which lies opposite the upper side and is remote from the cover layer D.

The cavity C accommodating the contact lens and the preserving solution is arranged in the rear and central region of the base portion. The cavity C comprises two portions which make a continuous and smooth transition into one another. The first portion of the hollow chamber C is a substantially dish-shaped main chamber 11, the dimensions of which are so chosen that it can accommodate contact lenses of all current sizes but is not substantially larger than those lenses. A practical value for the diameter of the main chamber 11 measured in the plane E of the flange 1, is, for example, approximately 20 mm, and a practical value for the depth of the main cavity measured with respect to the plane E of the flange 1 is approximately 6 mm. The second portion of the cavity C is a secondary cavity 12, the shape of which can best be compared to that of a tapering or funnel-shaped channel that becomes continuously narrower and flatter in the direction away from the main cavity 11. That secondary cavity 12 adjoins the side, or, in the above terminology, the front, of the main cavity 11 and, as already mentioned, makes a smooth transition into the latter. The separating line 13 inserted in FIG. 2 between the two cavity portions can therefore not be seen in reality. The geometrical spatial form of the secondary cavity 12 is such that the main cavity 11 and the secondary cavity 12 together, that is to say, the cavity C, have an asymmetrical drop-shaped contour 14 in the plane E of the flange 1. The tip 14a of the "drop" lies approximately on the central line M, or the longitudinal axis, of the base portion and is directed forwards towards the grip region 3 of the flange 1. The already-mentioned sealing zone 2 is located round the circumference, or the contour 14, of the cavity. Owing to the drop shape of the contour 14, the sealing area 2 also has a tip 2a at which the pulling-off begins and by which the pulling-off is facilitated.

It is surprising discovered here that by utilizing a plastic container with a sealing area having a micro-texture pattern, moisture or water drops that is present between the cover sheet and plastic container can be displaced away from the seal area to improve contact and sealing between the cover sheet and the plastic container facilitates a proper hemetic heat seal between the same. The micro-texture pattern could be a rough surface with a roughness having a proper RMS values, a plurality of raises, raised pattern and combinations therefore.

Figure 3:
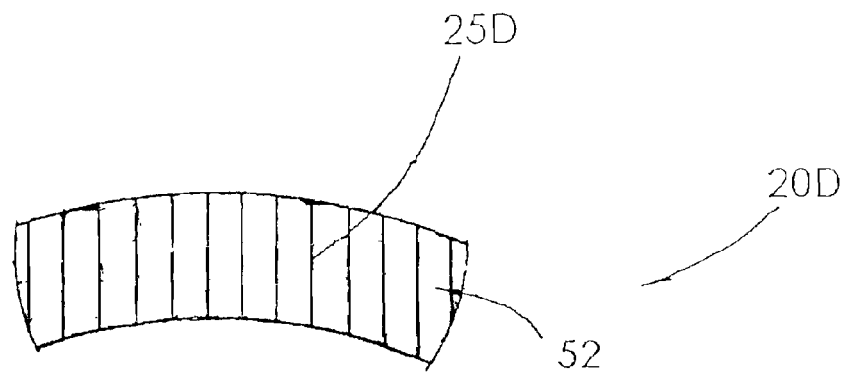
FIG. 3 show the micro-texture pattern on the sealing zone of a contact lens storage container comprises a plurality of raised parallel lines.

In the embodiment shown in FIG. 3 depicts a micro-texture pattern of the sealing area (only a section of the sealing area shown) according to an example embodiment of the present invention. In this embodiment, the micro-texture pattern 20D includes many raised parallel lines 25D. The raised lines 25D define recessed channels or cavities 52 there between. The number of raises 25D can vary. As the micro-texture pattern 20D of the sealing area is pressed against the laminate foil cover, a heated flat seal plate is initially pressed along the raised lines 25D and any moisture or/and water beads present between the cover and plastic bowl is moved away along the recesses 52. In this manner, a hermetic heat seal can still be formed between the foil cover and plastic shell, despite any droplets or moisture that may be present between the cover and shell along the seal area.

Figure 4:
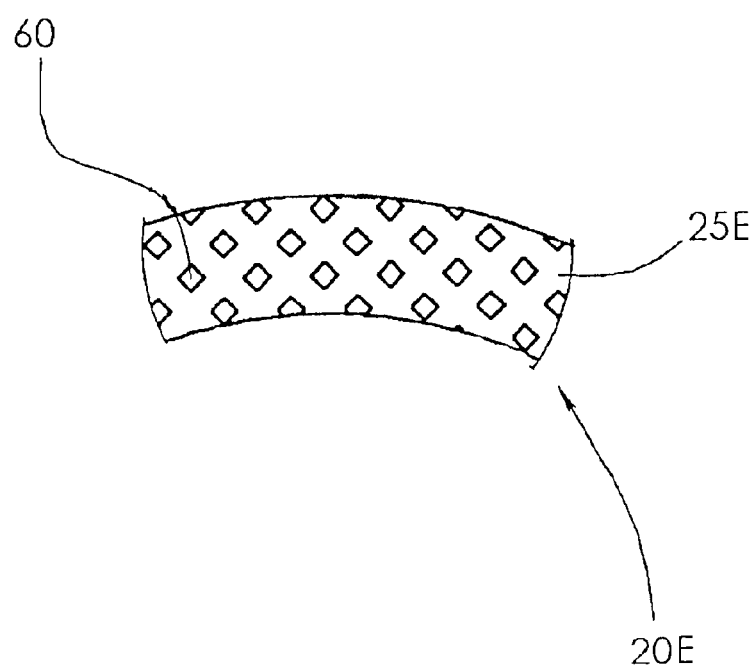
FIG. 4 show the micro-texture pattern on the sealing zone of a contact lens storage container comprises a plurality of raised spots.

Another embodiment shown in FIG. 4 depicts a micro-texture pattern of the sealing area (only a section of the sealing area shown) according to an example embodiment of the present invention. This micro-texture pattern 20E contains a plurality of raised spots 60 on the sealing area. In various embodiments, raised spot 60 refers to a raised small area of a surface that can be any shape, regular or irregular, such as cube-shaped, as depicted, round, square, hexagonal, elongated, triangular, rectangular shape or otherwise. As the micro-texture pattern 20E of the sealing area is pressed against the laminate foil cover, a heated flat seal plate is initially pressed on the plurality of raised spots and any moisture or/and water beads present between the cover and plastic bowl is moved away along the recesses 25E. In this manner, a hermetic heat seal can still be formed between the foil cover and plastic shell, despite any droplets or moisture that may be present between the cover and shell along the seal area.

Figure 5:
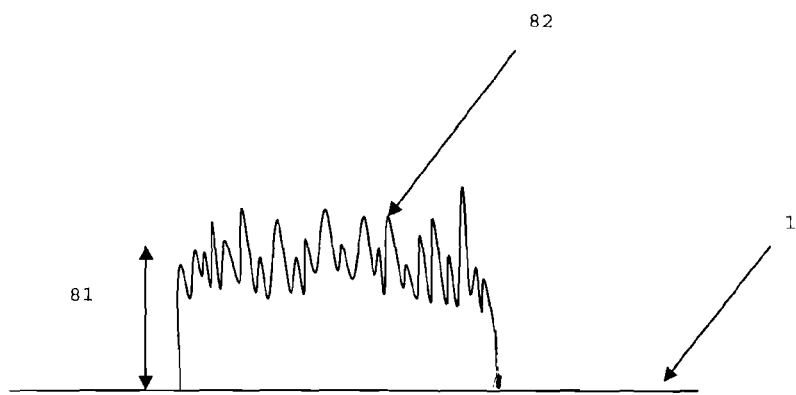
FIG. 5 show the micro-texture pattern on the sealing zone of a contact lens storage container comprises a step height rough surface.

In the embodiment shown in FIG. 5 depicts a micro-texture pattern of the sealing area according to an example embodiment of the present invention. In this embodiment, the micro-texture pattern contains a step height rough surface. The term "a step height rough surface" include two elements: a) a step height (81) refers to that a sealing area being raised above the flat flange plane (2) away from the cavity; b) a rough surface (82) refers to that the surface of the raised sealing area having a rough texture. In accordance with this aspect of the invention, the raised sealing area has a step height at least about 10 μm, preferably from 10 μm to 150 μm, more preferably from 15 μm to 100 μm, even more preferably from 20μm to 80 μm, most preferably from 25μm to 60 pm. In accordance with this aspect of the invention, the raised sealing area has a root mean square surface roughness at least 5 μm RMS, preferably from 5 μm to 50 μm RMS, more preferably from 8 μm to 30 μm RMS, even more preferably from 10μm to 20 μm RMS, most preferably from 11 μm to 15 μm RMS.

The sealing area has a raised rough surface displaces any water droplets or moisture that may exist between the foil cover and the plastic shell during the heat seal process. In another embodiment related to the step height rough surface, the step height rough surface has a sectional height gradually higher from the outer edge of the cavity (c of FIG. 2) toward the inner edge of the cavity (c of FIG. 2). As the micro-texture pattern of the sealing area is pressed against the laminate foil cover, a heated flat seal plate is initially pressed on the raised area around the inner edge of the cavity (c of FIG. 2) and any moisture or/and water beads present between the cover and plastic bowl is moved away toward the outer edge of the cavity (c of FIG. 2). In still another embodiment related to the step height rough surface, the step height rough surface has a sectional height gradually higher from the inner edge of the cavity (c of FIG. 2) toward the outer edge of the cavity (c of FIG. 2). As the micro-texture pattern of the sealing area is pressed against the laminate foil cover, a heated flat seal plate is initially pressed on the raised area around the outer edge of the cavity (c of FIG. 2) and any moisture or/and water beads present between the cover and plastic bowl is moved away toward the inner edge of the cavity (c of FIG. 2).

Furthermore, the final sealing height is calibrated when the force brought down by the sealing shoe is at 600N. At the sealing summit, due to the raised rough surface, the force is greater than 600N that would provide a tighter grip making the final sealing area to be more compact, flatter, and smoother. Thus, better adhesion and therefore stronger seal is achieved that enhanced the peeling force. In the present invention, confocal Scanning Laser Microscope has been used to measure the surface roughness and step height.

The present invention is also generally directed to a plastic container for storing a hydrogel contact lens in a liquid, the container comprising: a cavity and a flat flange that horizontally extends in a plane around the perimeter of the cavity, wherein the flange having a sealing area surrounding circumferentially and adjacently about of the cavity, wherein the sealing area having a micro-texture pattern.

The sealing area has width about 2 mm and may be introduced a micro-texture pattern by a variety of techniques, but the most convenient method is to use of the mold having a micro-texture pattern to produce the container. Electron discharge machining (EDM) is an electron discharge method which etches a micro-texture pattern on the surface of the mold through the application of electricity. The surface of the mold can be further roughening by Electron discharge machining (EDM) or also be sandblasted using a grit of appropriate size.

The experiment results:

The roughness is ranged from 12.3 μm-13.4 μm for the poly-propylene container of present invention compared with the control poly-propylene container of 9.6-10.9 μm. the poly-propylene container of present invention has about 25% increase in roughness comparing to the control poly-propylene container. In addition, the step height is ranged from 25-60 μm. The trial results indicate that the container of this invention on sealing area of poly-propylene container does not change any incoming specifications. This indicate that the container of the invention does not affect the seal area flatness; overall length, width and height of container. However, the container of the invention essentially eliminates the seal leakage problem and seal width narrow problem.

TABLE 1

Summary of Engineering Evaluation Report of this New invention:

|  | Container of the Invention | Control Container (existing) |
| --- | --- | --- |
| Seal Leakage | 0 out of 10,000 samples | 7 out of 10,000 samples |
| Seal Width Narrow Issue | 0 out of 10,000 samples | 263 out of 10,000 samples |
| Incoming Inspections | Passed | Passed |
| Average Peel off Force Measurement | 14.9 N | 13.4 N |

While the invention has been described with reference to preferred and example embodiments, it will be understood by those skilled in the art that a variety of modifications, additions and deletions are within the scope of the invention, as defined by the following claims.

What is claimed is:

1. A method for packaging a hydrogel contact lens, comprising the steps of:
   (a) providing a plastic container having a cavity and a flat flange that horizontally extends in a plane around the perimeter of the cavity, wherein the flange having a sealing area surrounding circumferentially and adjacently about of the cavity, wherein the sealing area having a micro-texture pattern,
   (b) placing an amount of a packaging solution and the hydrogel contact lens in the container, wherein the amount of the packaging solution is sufficient to have the hydrogel contact lens to be fully immersed;
   (c) heat sealing the container using a heated flat seal plate with a flexible cover sheet which is a laminate material comprising a metal foil layer and at least one polymer layer to form a storage package of the soft contact lens; wherein during the step of heat sealing, the micro-texture pattern engages a laminate foil cover and displaces water beads present between the laminate foil cover and the plastic container in the sealing area to form a heat seal, provided that after heat sealing the sealing area is smooth and leveled to the flange wherein the micro-texture pattern comprises a step height rough surface, wherein the step height rough surface pattern thereon has an overall root mean square surface roughness of between 5 μm to 50 μm.

2. The method of claim 1, wherein the micro-texture pattern comprises a plurality of raised spots.

3. The method of claim 1, wherein the micro-texture pattern comprises a plurality of raised parallel lines.

4. The method of claim 1, wherein the step height rough surface pattern thereon has an overall root mean square surface roughness of between 8 μm to 30 μm.

5. The method of claim 1, wherein the step height rough surface pattern thereon has an overall root mean square surface roughness of between 10 μm to 20 μm.

6. The method of claim 1, wherein the step height rough surface pattern thereon has an overall root mean square surface roughness of between 11 μm to 15 μm.

7. The method of claim 1, wherein the step height rough surface has a sectional height gradually higher from the outer edge of the cavity (c of FIG. 2) toward the inner edge of the cavity (c of FIG. 2).

8. The method of claim 1, wherein the step height rough surface has a sectional height gradually higher from the inner edge of the cavity (c of FIG. 2) toward the outer edge of the cavity (c of FIG. 2).

\* \* \* \* \*